United States Patent [19]
Nelson

[11] Patent Number: 5,957,525
[45] Date of Patent: Sep. 28, 1999

[54] PICKUP TENT

[76] Inventor: Ronald D. Nelson, 57006 - 873rd Rd., Coleridge, Nebr. 68727

[21] Appl. No.: 08/838,614

[22] Filed: Apr. 10, 1997

[51] Int. Cl.⁶ ....................................................... B60P 3/39
[52] U.S. Cl. ........................... 296/165; 296/159; 296/164; 296/100.06
[58] Field of Search .................................... 296/159, 164, 296/165, 100.06

[56]       References Cited

U.S. PATENT DOCUMENTS

| | | |
|---|---|---|
| D. 340,689 | 10/1993 | Wolcott et al. . |
| 3,466,082 | 9/1969 | Branch .................................... 296/165 |
| 3,708,199 | 1/1973 | Throssell . |
| 3,737,190 | 6/1973 | Smith et al. ............................. 296/159 |
| 4,065,166 | 12/1977 | Shoemaker .............................. 296/159 |
| 4,263,925 | 4/1981 | Arganbright . |
| 4,294,484 | 10/1981 | Roberton . |
| 4,296,960 | 10/1981 | Winchester . |
| 4,310,194 | 1/1982 | Biller ...................................... 296/159 |
| 4,332,265 | 6/1982 | Baker . |
| 4,566,729 | 1/1986 | Magnino . |
| 4,607,876 | 8/1986 | Reed . |
| 4,652,040 | 3/1987 | Mahan . |
| 5,340,188 | 8/1994 | Goble ................................... 296/100.06 |
| 5,419,607 | 5/1995 | Oliveira ................................... 296/159 |
| 5,558,392 | 9/1996 | Young ..................................... 296/165 |
| 5,632,522 | 5/1997 | Gaitan et al. ....................... 296/100.06 |

*Primary Examiner*—Joseph D. Pape
*Assistant Examiner*—Kiran B. Patel
*Attorney, Agent, or Firm*—Suiter & Associates PC

[57]        ABSTRACT

A pickup tent which may be removably mounted to a bed of a pickup truck comprising a removable mounting frame including frame sections removably attached to the top surfaces of the front and sidewalls of the pickup truck bed, a generally rigid cover disposed over the pickup truck bed and hinged to the front wall frame section so that the cover pivots vertically about the hinge. The cover can then be extended from a closed position flush with the top surfaces of the sidewalls of the bed to an erected position forming an angle to the top surfaces the bed sidewalls. When the cover is in the open position, a fabric tent enclosure is extended from the bottom surface of the cover to the bed of the pickup truck. A pair of support rods which are pivotally mounted between the bottom surface of the cover and each sidewall frame section support the cover in the open position. These support rods pivot and collapse as the cover is rotated to the closed position.

15 Claims, 9 Drawing Sheets

PICKUP TENT

TECHNICAL FIELD

The present invention relates generally to camping equipment and specifically to shelters such as tents, campers and the like which may be mounted in the bed of a pickup truck.

BACKGROUND OF THE INVENTION

Many camping enthusiasts prefer pickup truck mounted campers or tents over trailers or free-standing tents because of the convenience and security these shelters afford. As a result, several different types of pickup truck mounted campers and tents have been developed over the years to meet the needs of those seeking a comfortable, convenient home-away-from home for travel or weekend outings.

Hard shell or rigid campers have long been known to the art. These campers typically comprise a rigid metal or wooden frame covered by a metal, plastic, or fiberglass shell. However, because of this construction, hard shell campers tend to be heavy and bulky. Users often find that they are difficult to remove from the bed of the truck should the truck is required for other purposes. Further, hard shell campers typically extend above the cab of the truck creating aerodynamic drag which increases the truck's fuel consumption and impairs its handling characteristics at highway speeds.

In an attempt to solve these and other problems associated with hard shell campers, collapsible campers were developed. A typical collapsible camper is disclosed by Robertson, U.S. Pat. No. 4,294,484. Like the Robertson camper, most collapsible campers include a rigid top disposed over the bed of the pickup truck. This rigid top may be elevated to a position several feet above the bed of the truck to form the roof of the camper structure. However, users often find that setting up the typical collapsible camper at the campsite is complex and time consuming. Additionally, collapsible campers like their hard shell counterparts, tend to be heavy and bulky, and may be difficult to install and remove from the truck.

Closely related to collapsible campers are tent campers which may be erected in the bed of a pickup truck. For example, Arganbright, U.S. Pat. No. 4,263,925, Biller, U.S. Pat. No. 4,310,194, Baker, U.S. Pat. No. 4,332,265, and Mahan, U.S. Pat. No. 4,652,040 all disclose variations of tents type campers comprising a tent fabric stretched over a modular frame which must be assembled and erected in the bed of a pickup truck. As with collapsible campers, tent campers may be difficult to assemble or erect. Thus, much time may be wasted setting up these shelters at the campsite.

Although most camping enthusiasts enjoy the spaciousness provided by the campers and tents disclosed in the prior art, many would prefer to spend the time necessary to set these campers up in pursuits such as sightseeing, hiking, fishing, and the like. Consequently, these users desire a simple pickup truck mounted tent that can be set up in a few easy steps to provide a basic shelter in which to sleep. Thus, it is desirable to provide a lightweight pickup mounted tent which is easily and quickly erected by the user.

SUMMARY OF THE INVENTION

Therefore, it is an object of the present invention to provide a lightweight pickup tent for mounting on or in the bed of a pickup truck. It is another object of the present invention that this pickup tent be easily and quickly erected by the user in a short amount of time. It is yet a further object of the present invention that the entire pickup tent be easily installed on and removed from the bed of the pickup without any modification of the bed or damage thereto. Yet another object of the present invention is that the pickup tent allow use of the bed to store items such as luggage when the tent is not erected.

In fulfillment of these objects, the present invention provides a pickup tent which may be removably mounted to a bed of a pickup truck. In an exemplary embodiment, a removable mounting frame may be attached to the top surfaces of the front and sidewalls of the pickup truck bed. This mounting frame includes a front wall frame section removably attached to the top surface of the front wall of the bed, and two sidewall frame sections which likewise are removably attached to top surfaces of the bed's sidewalls. A generally rigid cover is disposed over the pickup truck bed. This cover is hinged to the front wall frame section so that the cover pivots vertically about the hinge. The cover can then be extended from a closed position flush with the top surfaces of the sidewalls of the bed to an open position. In this open position the cover forms an angle to the top surfaces the bed's sidewalls. Likewise, the cover may be pivoted from this open position back to the closed position where it is flush with the top surfaces of the sidewalls. The cover is supported in the open position by a pair of support rods which are pivotally mounted between the bottom surface of the cover and each sidewall frame section. These support rods pivot and collapse as the cover is rotated to the closed position.

When the cover is in the open position, a tent enclosure comprising two generally triangular side tent walls and a rear tent wall extends from the bottom surface of the cover to the pickup truck bed. In a preferred embodiment, the pickup tent may further comprise an expandable rod extending between each sidewall through a sleeve in the bottom edge of the rear tent wall. This expandable rod secures the bottom edge of the rear tent wall against the bed of the pickup truck so that the rear tent wall is held at least partially taut. When the pickup tent is not in use (i.e. in the closed position) the tent enclosure folds and stores under the cover so that the cover may be moved to the closed position. The side tent walls may further comprise mesh tent windows. Similarly, the rear tent wall may include a tent door or entryway. These windows and doors may be covered by flaps to protect occupants against the elements. Rain deflection flaps comprising an outer flap which extends over the outer surface of the sidewall of the pickup truck bed and an inner wall which is removably attachable to the sidewall frame section by hook and loop material fasteners prevent the collection of rainwater in the pickup truck bed.

BRIEF DESCRIPTION OF THE DRAWINGS

The numerous objects and advantages of the present invention may be better understood by those skilled in the art by reference to the accompanying figures of which.

DETAILED DESCRIPTION OF SOME EXEMPLARY EMBODIMENTS

Figure 1:
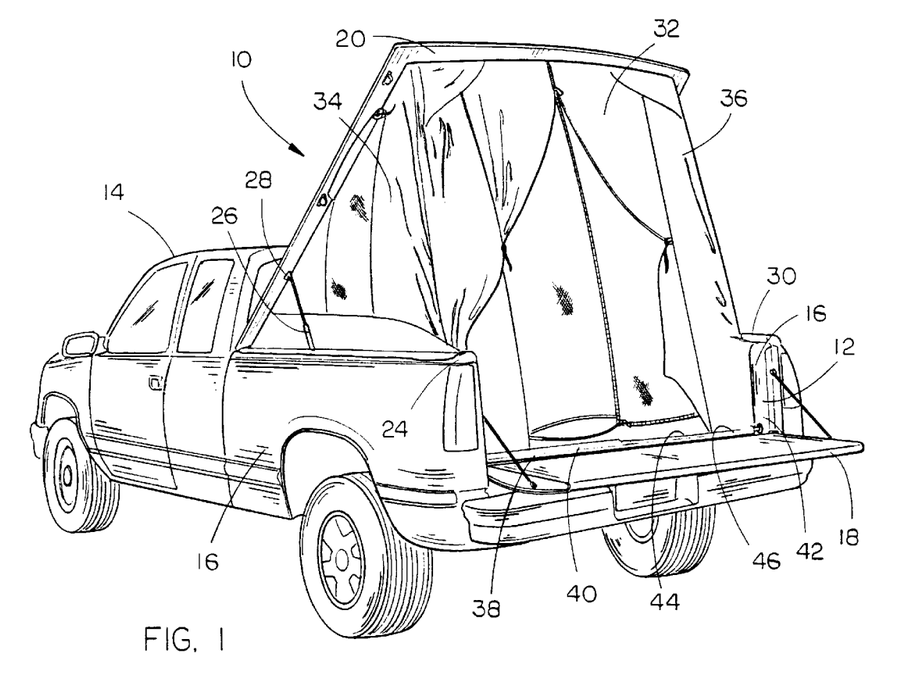
FIG. 1 is a pictorial view illustrating a pickup tent, according to an exemplary embodiment of the present invention, mounted in the bed of a pickup truck.

FIGS. 1 through 12 disclose a pickup tent 10 according to an exemplary embodiment of the present invention. In FIG. 1, the pickup tent 10 is shown fully open or erected in the bed 12 of a typical pickup truck 14. The pickup truck bed 12 comprises a generally rectangular floor 15 (FIG. 6), first and second generally parallel sidewalls 16, a front wall (not shown) 17 (FIG. 6), and a rear tailgate 18, opposite the front wall 17 (FIG. 6), capable of being positioned to a vertical, raised position and a horizontal, lowered position. Those skilled in the art will recognize that although a standard pickup truck bed is shown in FIG. 1, the pickup tent may be easily adapted for use with other common pickup truck beds such as step-sided beds and the like.

Figure 2:
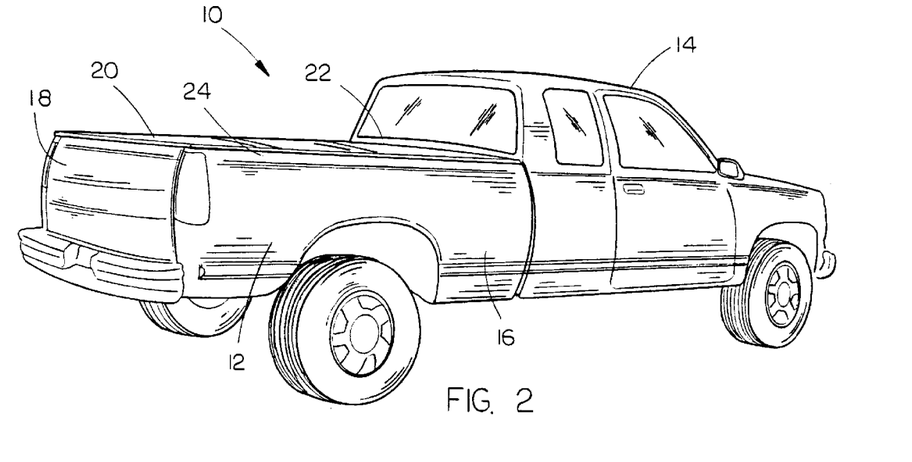
FIG 2 is a pictorial view illustrating the pickup tent according to the embodiment of the invention shown in FIG. 1 in a lowered or closed position on the pickup truck bed.

As illustrated in FIGS. 1 and 2, the pickup tent comprises a generally rigid cover 20 which may be disposed over the first and second sidewalls 16 and the front wall 17 (FIG. 6) of the pickup truck bed 12. The forward edge 22 of the cover 20 may be hinged to a front wall frame section (not shown) which may be removably mounted to the top surface of the front wall of the pickup truck bed 12. Alternatively, the cover 20 may be attached via hinge member 120 (FIGS. 3, 11A and 11B) attached to the forward edge of side rail 30, and second hinge member 88 (FIGS. 3, 11A and 11B) attached to the forward edge 22 of cover 20. The cover 20 may be pivoted vertically about this hinge so that the cover 20 may be rotated from a closed position flush with the top surfaces 24 of the sidewalls 16 of the pickup truck bed 12 to an open or erected position (shown in FIG. 1).

In the erected position, as depicted in FIG. 1, the cover 20 forms an angle to the top surfaces 24 of the pickup truck bed sidewalls 16. The cover 20 may be supported in this erected position by a pair of support rods 26 which may be pivotally mounted between the bottom surface 28 of the cover 20 and first and second sidewall frame sections 30 (see FIGS. 3, 6, 7, 8, 9, 10, 11A, and 12). The support rods 26 preferably comprise gas filled struts or the like and may be positioned to pivot and collapse as the cover 20 is rotated to the closed position (as shown in FIG. 2). A tent enclosure 32 may be attached to the bottom surface 28 of the cover 20. This tent enclosure 32 may comprise generally triangular first and second side tent walls 34 and a generally rectangular rear tent wall 36. When the cover 20 is in the open or erected position, the side tent walls 34 may extend from the bottom surface 28 of the cover 20 to the sidewall frame sections 30 where they may be secured by fasteners. In a preferred embodiment according to the present invention, the fasteners may comprise hook and look fastener 130 (FIG. 8) attached to the side of rail 30 (see FIG. 8). By securing the side tent walls 34 to side rails 30, the side tent walls 34 are held at least partially taut. Likewise, the rear wall 36 of tent enclosure 32 may extend from the bottom surface 28 of the cover 20 to the base 38 of the tailgate 18. In a preferred embodiment of the present invention, the pickup tent 10 includes a expandable rod 40 extending between the inner surface 42 of each sidewall 16 through a sleeve 44 sewn into the bottom edge 46 of the rear tent wall 36. This expandable rod preferably secures the bottom edge 46 of the rear tent wall against the floor of the bed 12 so that the rear tent wall 36 is held at least partially taut.

FIG. 2 depicts the cover 20 of the pickup tent 10 in the closed position. Preferably, the cover 20 may be pivoted from the open or erected position to this closed position wherein it is flush with the top surfaces 24 of the sidewalls 16. When the pickup tent 10 is in this closed position, the tent enclosure (see FIG. 1) is preferably stored under the cover 20 allowing the cover 20 to be secured against the upper surfaces 24 of the sidewalls 16 of the pickup truck bed 12. In this fashion, the pickup tent cover 20 may function as a typical bed cover; securing items stored within the bed and reducing the aerodynamic drag caused by an open pickup truck bed, thus increasing fuel efficiency and improving the handling characteristics of the truck 14.

Figure 3:
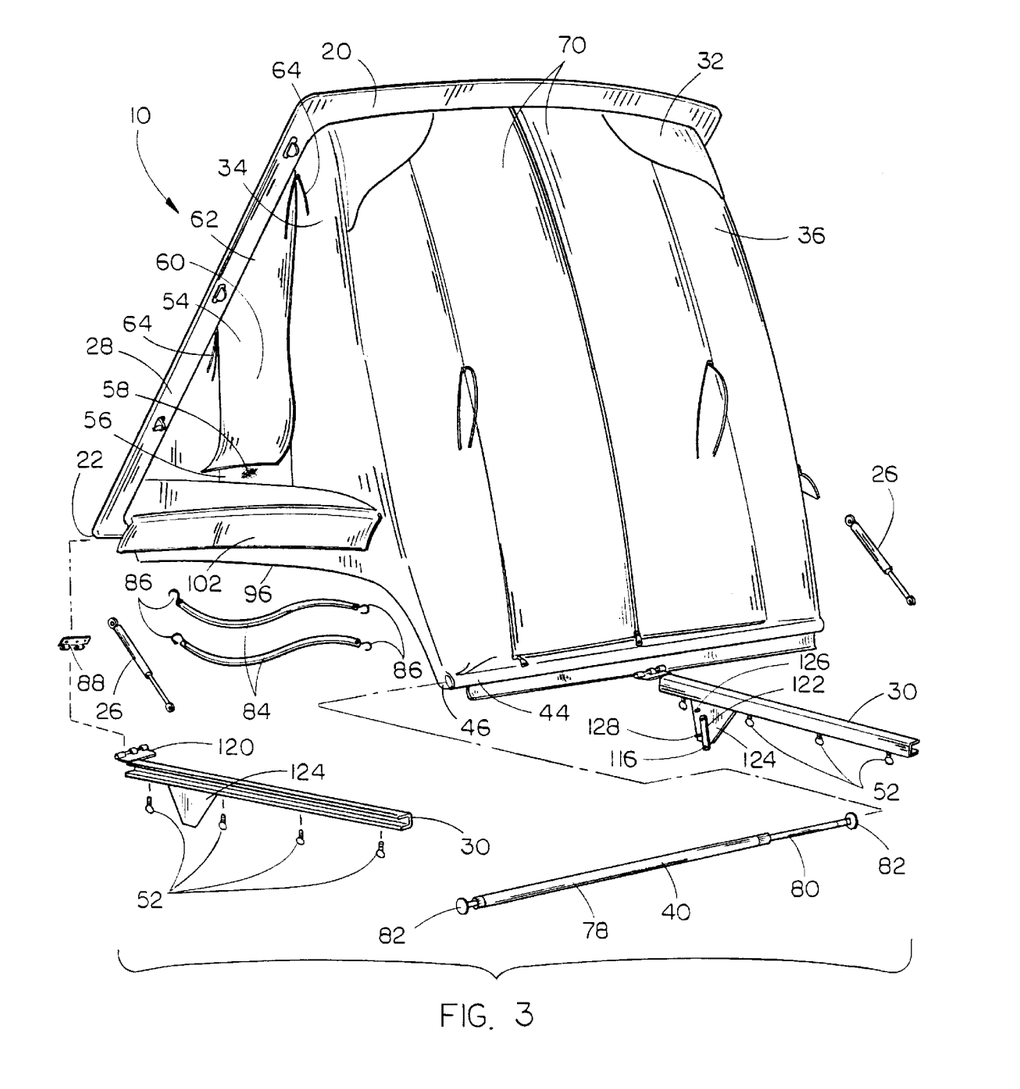
FIG. 3 is an exploded view illustrating the components of the pickup tent shown in FIGS. 1 and 2.

FIG. 3 is an exploded view depicting the various components comprising an exemplary embodiment of the pickup tent 10. As discussed in connection with FIGS. 1 and 2, the pickup tent 10 comprises generally rectangular, rigid cover 20. This cover 20 preferably comprises a rigid frame over which a shell of fiberglass, aluminum, plastic or the like is attached or, preferably, over which a preferably waterproof fabric, such as canvas, vinyl, or the like, is stretched and secured. The forward edge 22 of the cover 20 may comprise a generally C-shaped channel 50 (see FIG. 11A) extending along its length. This channel 50 forms one half of a hinge between the cover and a front wall frame section (not shown) which may be removably mounted to the top surface of the front wall of the pickup truck bed.

Figures 11A, 11B:
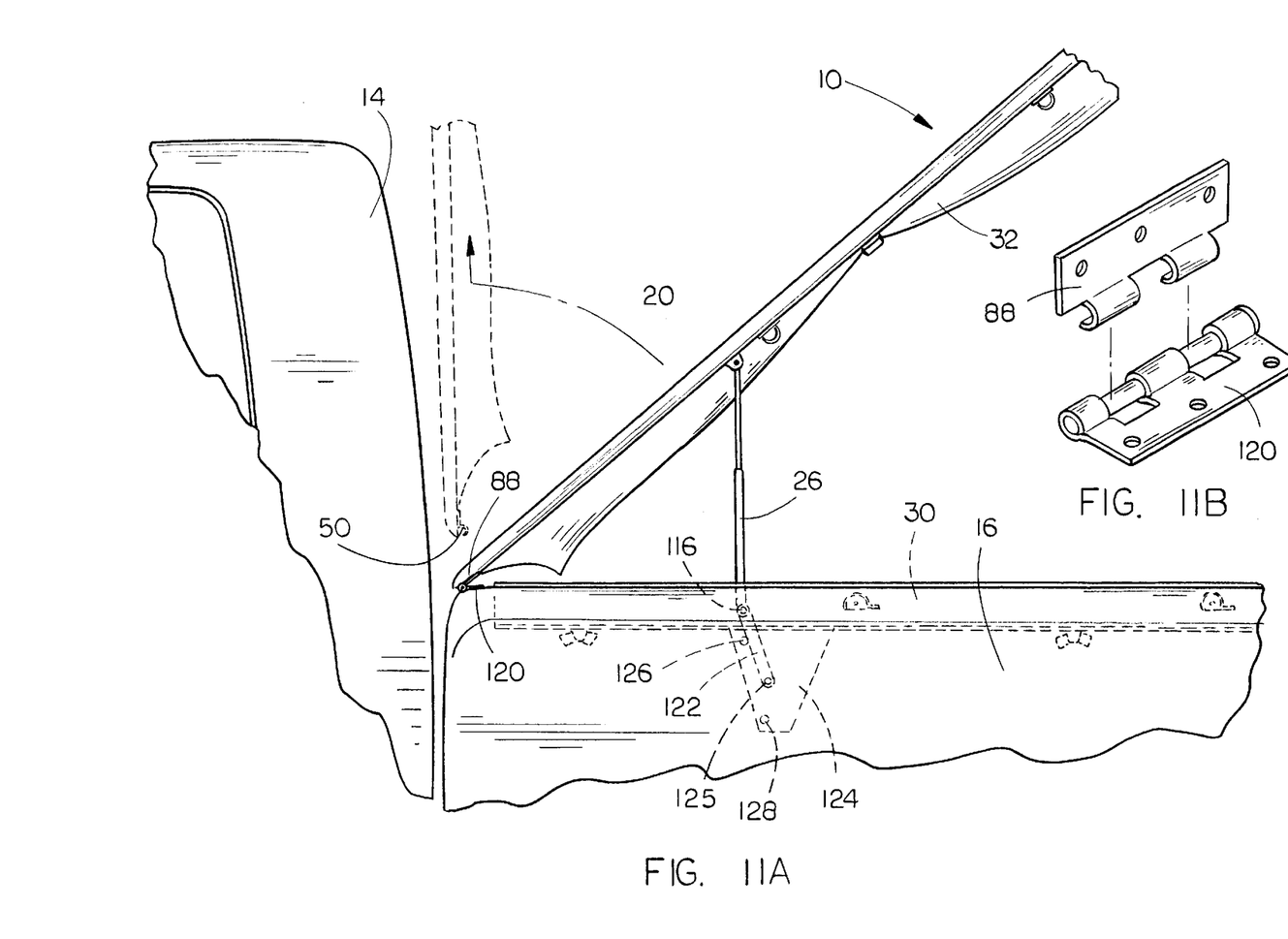
FIG. 11A is a partial cross-sectional side elevation view of the pickup tent shown in FIG. 1 depicting removal of the pickup tent from the bed of the pickup truck.
FIG. 11B is an exploded view of a preferred hinge assembly for rotatably attaching the tent cover.
Figure 12:
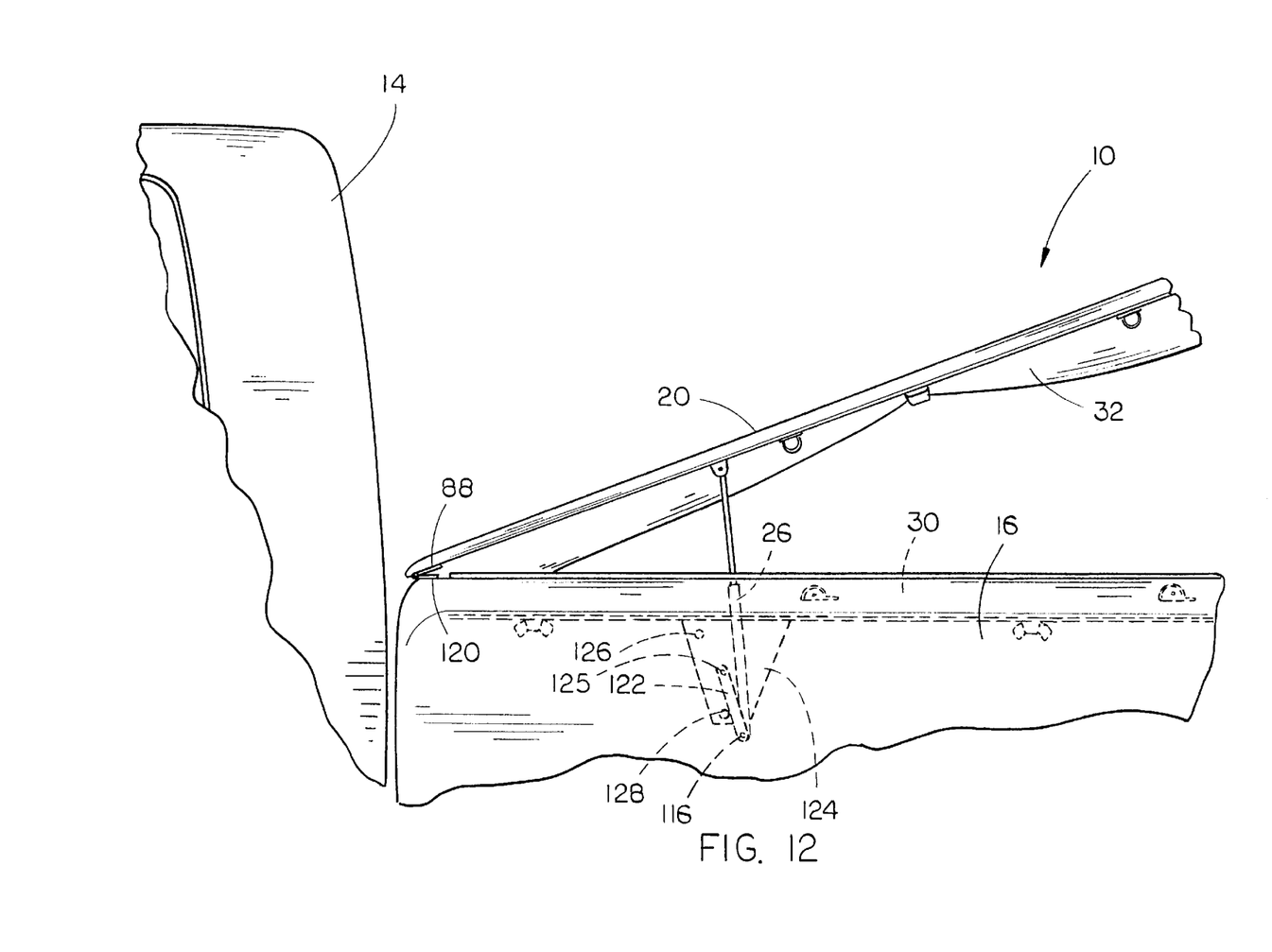
FIG. 12 is a side elevational view of the pickup tent according to the embodiment of the invention shown in FIG. 1 wherein the cover is being pivoted between its open or erected position and its closed position.

Alternatively, lid 20 may be rotatably attached to side rails 30 via hinge members 88 and 120 as depicted in FIGS. 11A and 11B.

In this fashion, the cover 20 may be pivoted vertically about the hinge to its open or erected position or to its closed position. When erected, the cover may be supported by a pair of support rods 26 which are pivotally mounted between the bottom surface 28 of the cover 20 and first and second sidewall frame sections 30. These sidewall frame sections 30 comprise generally C-shaped channels which may be removably attached to the sidewalls of a pickup truck bed by a plurality of fasteners 52 such as thumb screws or the like (see FIGS. 8 and 9). The support rods 26 preferably comprise gas filled struts or the like which are positioned to pivot from cargo to tent position, and collapse from cargo to close position as the cover 20 is rotated to the closed position (see FIG. 2). The pickup tent 10 also comprises a tent enclosure 32.

Figure 4:
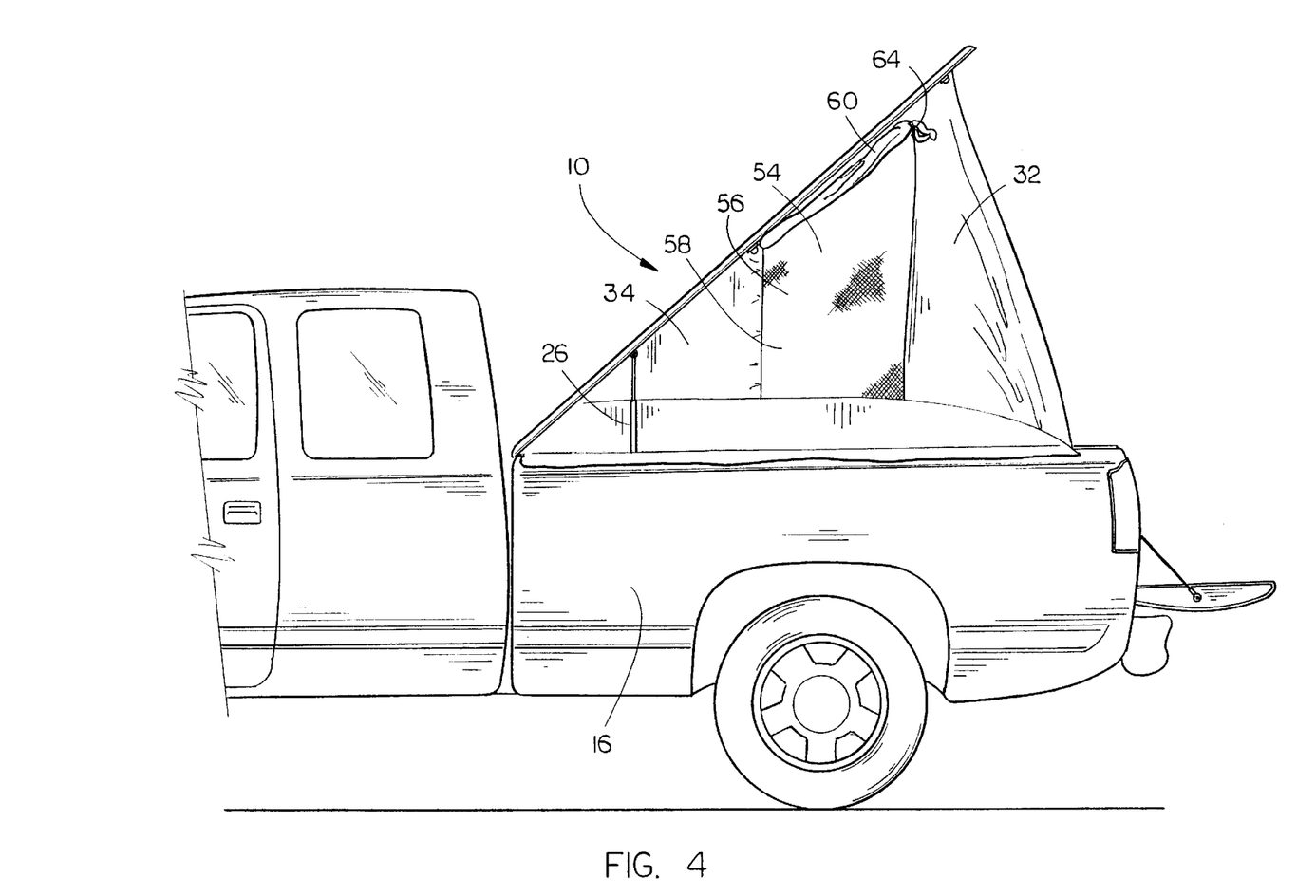
FIG. 4 is a side elevational view of the pickup tent according to the embodiment of the invention shown in FIG. 1 wherein the pickup tent is depicted in the open or erected position.

Tent enclosure 32 is preferably made from a typical tent fabric such as polyester, canvas, nylon taffeta, or the like, and comprises first and second triangular side tent walls 34 and a generally rectangular rear tent wall 36. A water-resistant or waterproof coating such as urethane or the like may be applied to the tent enclosure fabric. Further, the fabric may be treated to make it fire-resistant. As shown in FIGS. 3 and 4, tent windows 54 may be disposed in the side tent walls 34. These tent windows 54 preferably comprise an opening 56 disposed in the side tent wall 34 which may be covered by mesh, screen, or the like 58. This mesh 58 allows airflow through the tent enclosure 32 while preventing insects and other pests from entering. Alternatively, the tent window 54 may comprise a transparent material such as plastic, vinyl, or the like stretched over the opening 56. A window flap 60, preferably made of the same water-resistant fabric as the tent enclosure 32, may be disposed over the window opening 56 on the outside, or alternatively, the inside of the tent enclosure 32. This window flap 60 may include a top edge 62 which may be sewn into the side tent wall 34 above the tent window opening 56. The window flap 60 may be rolled up, exposing the mesh 58 covered opening 56 to allow the window to, in effect, be opened. Ties 64 disposed on the side tent walls 34 may be tied around the window flap 60 once it is rolled up to secure the flap 60 in the rolled up position (see FIG. 4). The window flap 60 may be unrolled such that it at least partially covers the window opening 56 and may be secured in this closed position by fasteners such as a zipper, snaps, ties, or the like.

Figure 5:
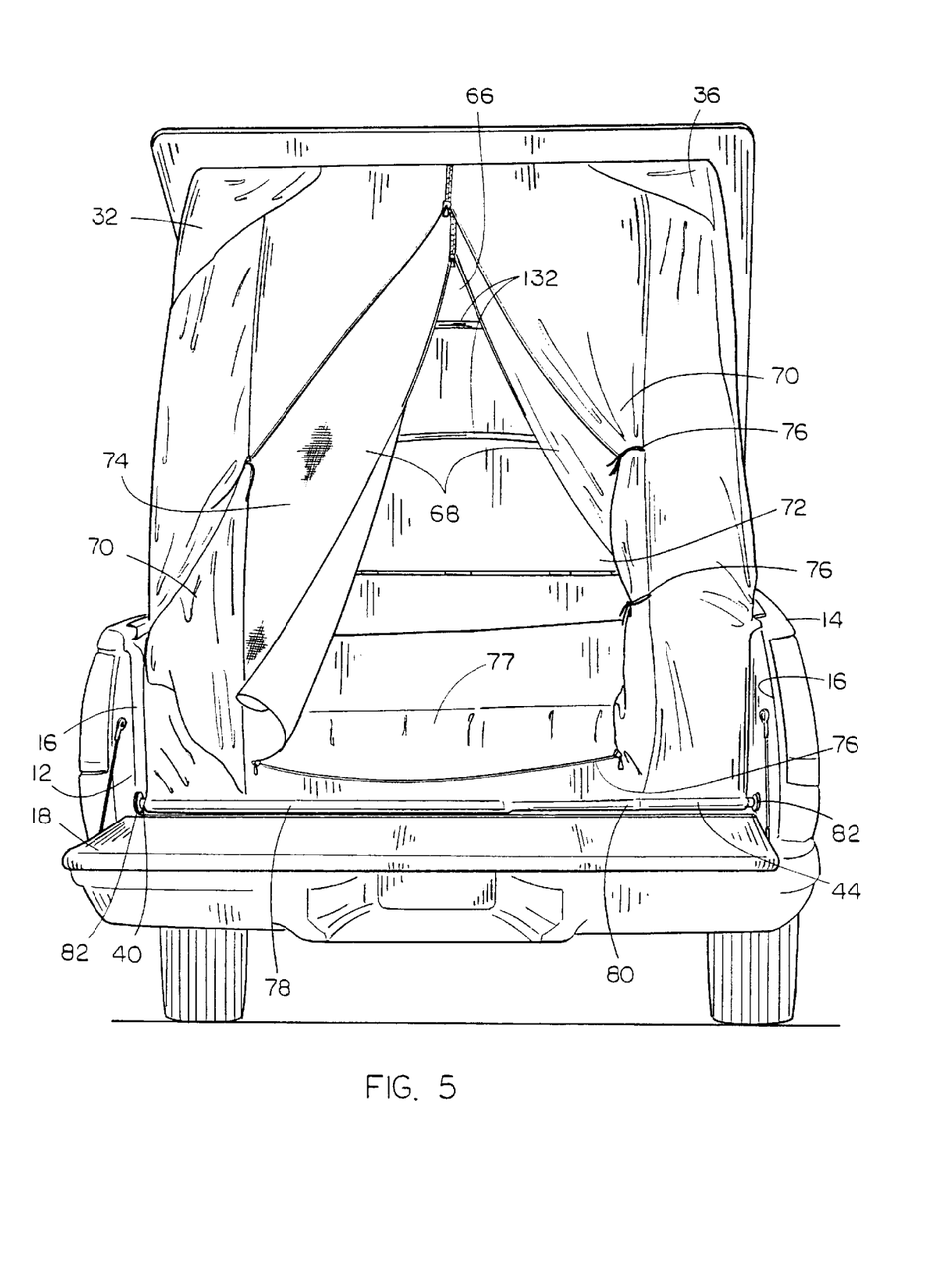
FIG. 5 is a rear elevational view of the pickup tent according to the embodiment of the invention shown in FIG. 1.

As shown in FIGS. 3 and 5, the rear tent wall 36 may include an opening 66 to allow the user to enter and exit the pickup tent 10. In a preferred embodiment, one or more sets of tent flaps 68 and 70 may be disposed over this opening 66 to form a tent door or entryway 72. This tent door 72 may include inner door flaps 68, a significant portion of which may comprise a mesh panel 74, and outer door flaps 70, made of the a water-resistant fabric such as the fabric comprising the tent enclosure 32. Both the inner and outer door flaps 68 and 70 may include a fastening means 76 such as zippers, ties, snaps, or the like to hold the flaps 68 and 70 closed. Similarly, the rear tent wall 36 may comprise ties, snaps, or the like 76 to hold the outer door flap 70 open allowing airflow into the pickup tent 10 through the mesh panels 74 of the inner door flaps 68. Bedding materials 76 such as sleeping bags, a mattress, an air mattress, or the like may be placed on the floor of the bed 12 to provide a place for occupants to sleep. As shown in FIG. 5, the tailgate 18 of the pickup truck 14 may be lowered to facilitate entry into and exit from the pickup tent 10. The tailgate 18 may also be raised to provide added security to the tent assembly's occupants.

As shown in FIGS. 1, 3 and 5, the pickup tent 10 may further comprise a expandable rod 40 extending between each sidewall through a sleeve 44 sewn into the bottom edge 46 of the rear tent wall 36. This expandable rod 40 preferably secures the bottom edge 46 of the rear wall 36 against the floor of the pickup truck bed 12 so that the rear tent wall 36 is held at least partially taut. This rod 40 may comprise an outer rod half 78 disposed over an inner rod half 80. An internal spring (not shown) may be disposed in the outer rod half 78 such that the spring pushes against the inner rod half 80 to provide an expansion force in the rod 40 forcing the distal ends 82 of the rod 40 apart. The rod may thus be positioned between the inner surfaces 42 of the sidewalls 16 such that a force is exerted against each sidewall inner surface 42 holding the rod 40 in place. In an especially preferred embodiment, the bottom surface 28 comprises one or more arch supports 132 to support the fabric of cover 20 and shed water.

Figure 6:
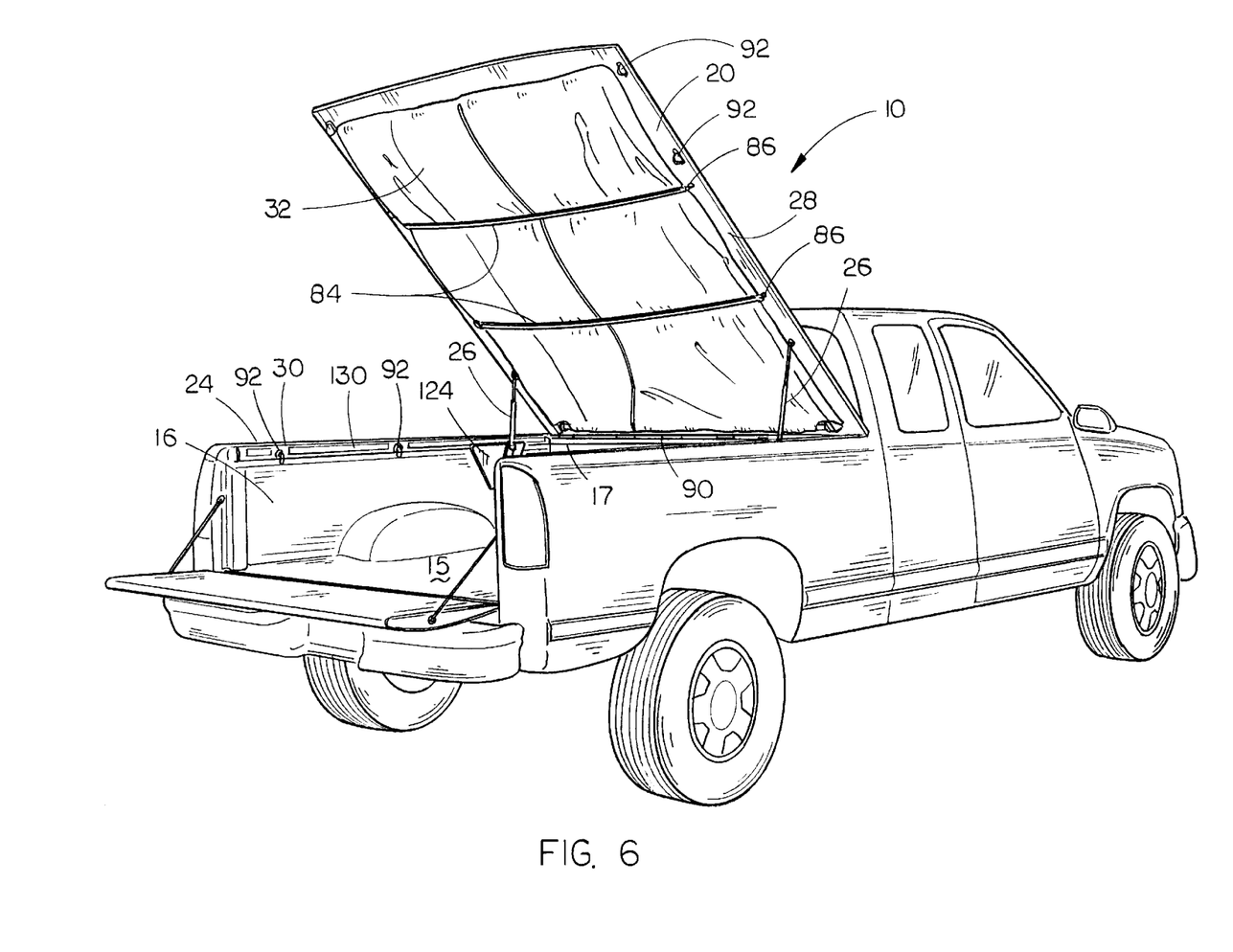
FIG. 6 is a pictorial view of the pickup tent according to the embodiment of the invention shown in FIG. 1 wherein the cover is pivoted to its open or erected position illustrating storage of the tent enclosure.

FIG. 6 depicts the cover 20 of the pickup tent 10 pivoted to its open or erected position prior to deployment of the tent enclosure 32. When the pickup tent 10 is not in use, the tent enclosure 32 may be gathered or folded and stored against the bottom surface 28 of the cover 20 so that the cover 20 may be rotated to the closed position and allow cover 20 to function as a pick up bed cover with storage space underneath. However, it should be noted that cover 20 may be closed without storing the tent enclosure up against the cover 20. This allows raising and lowering the lid 20 and allowing the tent enclosure 32 to simply collapse into the truck bed area 12 for continuous day to day camping without the need for storing tent enclosure. Thus, for example, one may very rapidly and conveniently convert the vehicle 14 for driving uses, e.g., during the day, and sleeping purposes, e.g., at night.

When storage of the tent enclosure against the surface 28 of cover 20 is desired, e.g., at the end of a camping trip or the like, straps 84, such as bungee chords, belts, or the like may extend from one edge of the bottom surface 28 of cover 20 over the folded tent enclosure 32 to the other edge to hold the tent enclosure 32 against the bottom surface 28 of the cover 20. These straps 84 may attach to the bottom surface 28 of the cover 20 by fasteners 86 such as hook and eye fasteners, snap fasteners, hook and loop material fasteners, or the like. Preferably, the straps 84 are made of a resilient material which may be stretched over the folded tent enclosure 32 to hold it firmly against the bottom surface 28 of the cover 20. However, those skilled in the art will recognize that an adjustable belt having a buckle or hook and loop material adjustment to its length may likewise be employed. FIG. 6 also illustrates the cover 20 in its open or erected position wherein it is supported by the support rods 26. The cover 20 has been pivoted around the hinge 88 mounted to the front wall frame section 90 in preparation of erection of the tent enclosure 32. As shown, the support rods 26 may extend from the sidewall frame sections 30 to support the cover 20 in the erected or open position. Fasteners 92 such as rotatable window latches or the like may be attached along outer edges of the cover 20 at various points. When the cover 20 is closed, these fasteners 92 secure the it against the upper surface 24 of the bed sidewalls 16.

Figure 7:
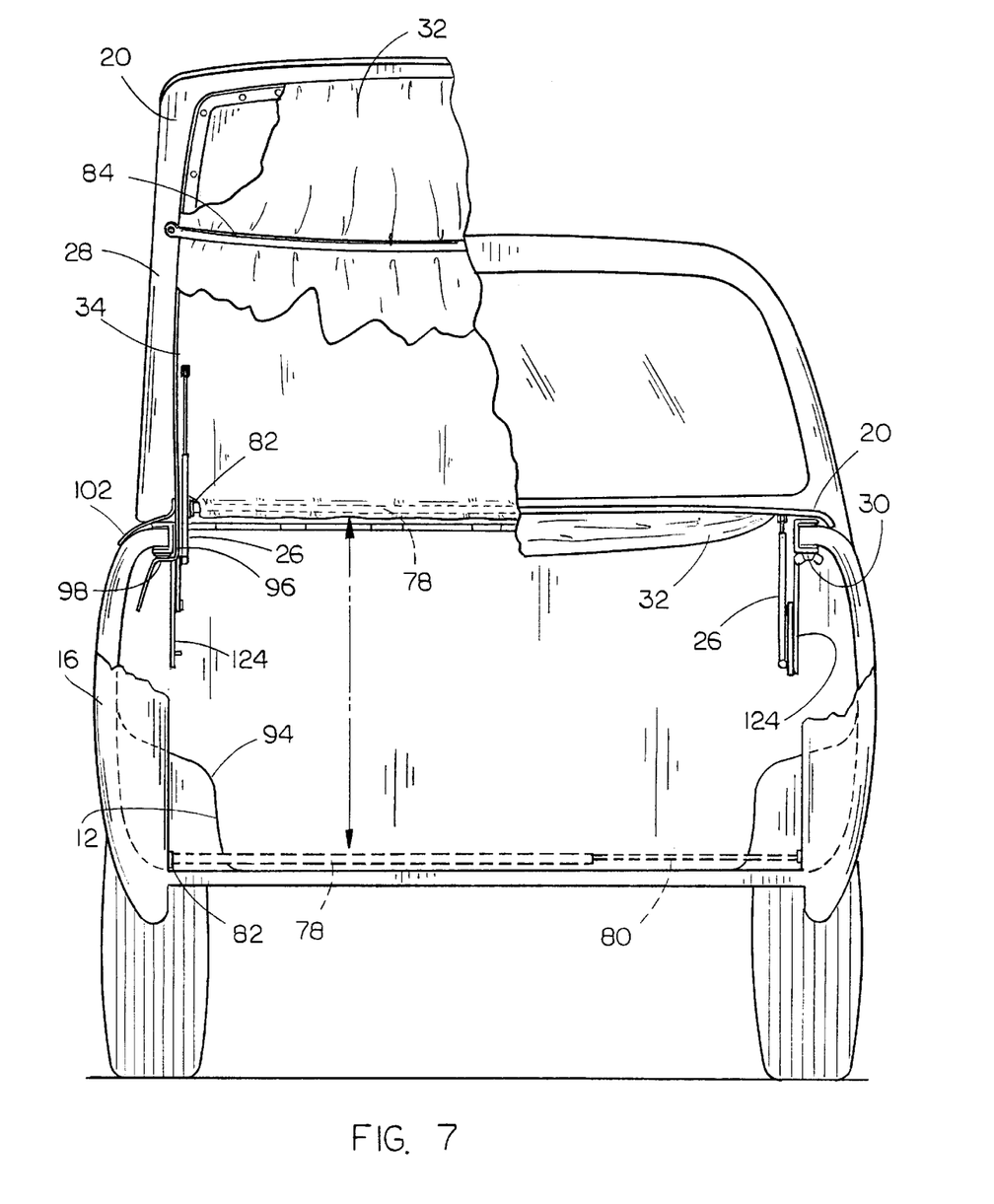
FIG. 7 is a partial cross-sectional rear elevational view of the embodiment of the present invention shown in FIG. 1 wherein the view is divided such that one half of the pickup tent cover is shown in the open or erected position and one half is shown in the closed position.

FIG. 7 is a partial cross-sectional rear elevational view of the present invention wherein the view is divided such that one half of the pickup tent cover 20 is shown in the open position and one half is shown in the closed position. Additionally, the interior shape 94 of the sidewalls 16 of the pickup truck bed 12 can be more clearly seen. In this figure, storage of the tent enclosure 32 is illustrated. As described earlier, when the cover 20 is in the closed position, the tent enclosure 32 is folded or gathered and secured against the bottom surface 28 of the cover 20 by straps 84. As the cover 20 is rotated to its open or erected position, these straps 84 preferably continue to hold the tent enclosure 32 against the bottom surface 28 of the cover 20. When the straps 84 are removed, the tent enclosure 32 may be lowered until the bottom edge 96 of the side tent walls 34 are adjacent to the sidewall frame sections 30. Hook and loop material fasteners 98 or the like may attach the bottom edges 96 of the side tent walls 34 to one or more surfaces of the sidewall frame sections 30 to secure the side tent walls 34 to the sidewalls 16 of the pickup truck bed 12. A rain flap 102, may be attached to an outer surface of the side tent walls 34. This rain flap 102 preferably extends over the outer surface of the bed sidewalls 16 to deflect rain to the outside of the pickup truck bed 12 preventing the entrance and harboring of moisture between truck bed 12 and the tent walls 34 and tent floor.

Figure 8:
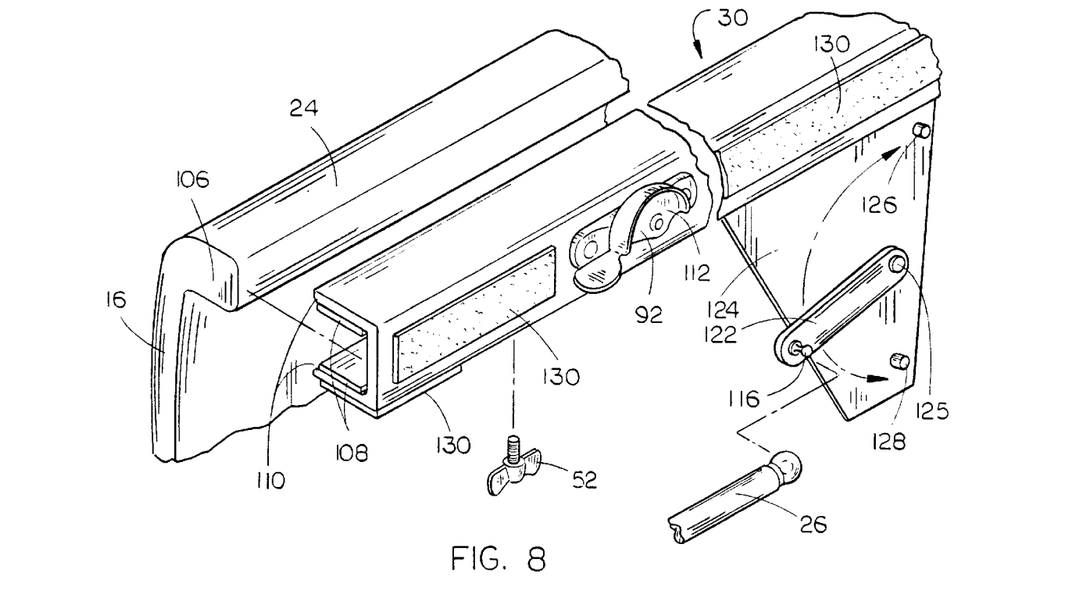
FIG. 8 is an exploded view of a sidewall frame section of the pickup tent shown in FIG. 1.
Figure 9:
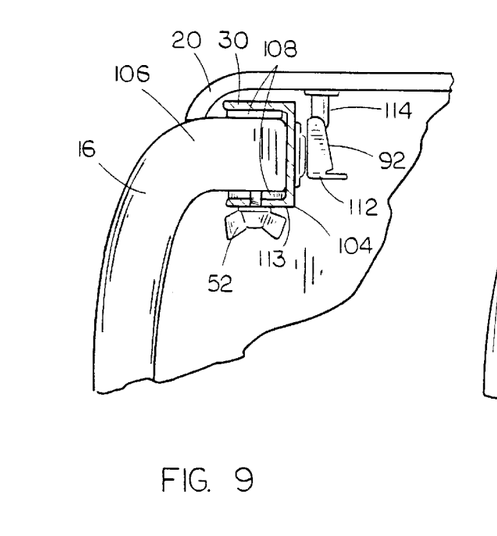
FIG. 9 is a cross-sectional view of the sidewall frame section shown in FIG. 7 illustrating fasteners used to secure the cover in the closed position.

FIGS. 8 through 11B illustrate the removable mounting frame and attachment of the rigid cover thereto. FIG. 8 depicts in detail a sidewall frame section 30 according to an exemplary embodiment of the present invention. The sidewall frame section 30 comprises a C-shaped metal channel 104 which is sized to fit over an inner lip 106 of the top surface 24 of the sidewall 16. Cushions 108 may be provided along the inner surfaces 110 of the channel 104 to prevent scratching of the truck's paint. These cushions 108 may comprise thin strips of foam rubber, cork, felt, or the like. Hook and loop material fasteners 130 may be adhered to one or more surfaces of the side rail 30. These hook and loop material fasteners 130 provide an attachment means for securing the side tent wall of the tent enclosure to the sidewall frame section 30. A plurality of fasteners 52 such as thumb screws or the like may be inserted through threaded holes in the bottom surface 113 of the channel 104. As shown in FIG. 9, these fasteners 52 may be tightened into the lower surface of the inner lip 106 of the pickup truck sidewall 16 to securely attach the sidewall frame section 30 to the inner lip 106. A fastener 92 such as a rotatable window latch or the like may be provided to secure the cover 20 in the closed position. When the cover 20 is placed in the closed position, the user may close the latching half 112 of the fastener 92, which is mounted to the sidewall frame section 30, over the inner post half 114, which is mounted on the bottom surface 28 of the cover 20, to secure the cover 20 to the sidewall frame section 30.

Figure 10:
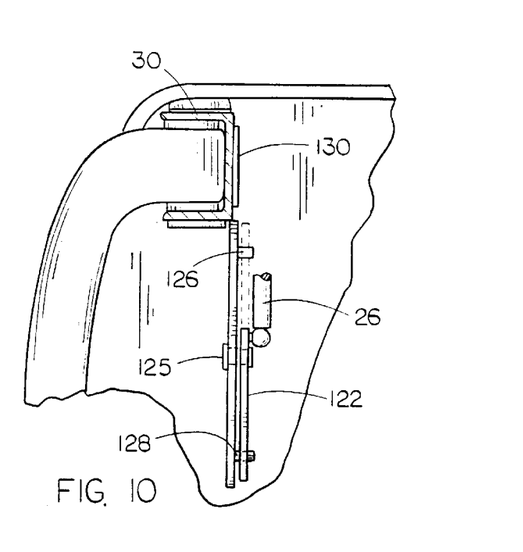
FIG. 10 is a cross-sectional view of the sidewall frame section shown in FIG. 7 illustrating the post onto which a support rod may be pivotally attached.

As can be seen in FIGS. 8 and 10, a support rod attachment post 116 may be affixed to arm 122 which rotates on pin 125. Pin 125 is mounted on a plate 124 which has two stopping pins 126 and 128. Plate 124 is affixed to frame member 30. Lift supports 26 preferably have ball sockets at each end allowing them to snap over support rod attachment post 116 by hand.

In an alternative embodiment, not shown, an eye (not shown) in one end of the support rod may be disposed over this post 116 to secure it to the sidewall frame section 30. A cotter pin or the like (not shown) may be placed diagonally through a hole (not shown) drilled through the outer end of the post 116 to secure the support rod to the sidewall frame section 30 while at the same time allowing the rod to pivot about the post 116.

FIG. 11A depicts removal of the pickup tent 10 from the bed 12 of a pickup truck 14. The cover 20 may be raised to the open or erected position where it is supported by the support rods 26. The ends of the support rods 26 attached to the sidewall frame section 30 may then be removed from the support rod attachment posts 116. The user may then lift the cover 20, support rods 26, and tent enclosure 32 from the bed 12 of the truck 14. The user may then remove the sidewall frame sections 30 from the sidewalls 16 by loosening the thumb screw fasteners 52 and lifting the frame section channel 104 off the sidewall 16. The front wall frame section 90 (see FIG. 6) may be removed in the same manner.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. A pickup tent removably mounted to a bed of a pickup truck, said bed having a generally rectangular floor, first and second generally parallel sidewalls, a front wall, and a rear tailgate opposite said front wall, said tailgate capable of being positioned to a vertical, raised position and a horizontal, lowered position, said pickup tent comprising:

(a) a removable mounting frame including a front wall frame section removably attached to a top surface of said front wall and first and second sidewall frame sections, said first and second sidewall frame sections removably attached to top surfaces of said first and second sidewalls respectively;

(b) a generally rigid cover disposed over said bed, said cover hinged to said front wall frame section by a hinge so that a said cover pivots vertically about said hinge from a closed position flush with the top surfaces of said first and second sidewalls of said bed to an erected position at an angle to the top surfaces of said first and second sidewalls of said bed, and from said erected position at an angle to the top surfaces of said first and second sidewalls of said bed to said closed position flush with said top surfaces of said first and second sidewall frame sections;

(c) a tent enclosure having first and second side tent walls and a rear tent wall, said tent enclosure extending from a bottom surface of said cover to said first and second sidewall frame sections when said cover is in the open position;

(d) a support rod having first and second ends, said first end pivotally mounted to either said first or said second sidewall frame section and said second end pivotally mounted to the bottom surface of said cover, said support rod extending to support said cover while said cover is in the open position and collapsing as said cover is pivoted to the closed position; and (e) an expandable rod extending from said first sidewall through a sleeve in a bottom edge of said rear tent wall to said second sidewall, said expandable rod holding said bottom edge of said rear tent wall secure against the floor of said bed so that said rear tent wall is held at least partially taut.

2. The pickup tent of claim 1 wherein said tent enclosure at least partially folds and stores under said cover so that said tent enclosure is substantially flush with the bottom surface of said cover when said cover is rotated to the closed position.

3. The pickup tent of claim 1 wherein said first and second side tent walls of said tent enclosure further comprise windows, said windows including a mesh disposed over an opening in said first or second walls of said tent enclosure.

4. The pickup tent of claim 3 wherein said windows are substantially covered by a window tent flap.

5. The pickup tent of claim 1 wherein said rear tent wall of said tent enclosure further comprises a door opening.

6. The pickup tent of claim 5 wherein said door opening is substantially covered by a door opening tent flap.

7. The pickup tent of claim 1 wherein said first and second walls of said tent enclosure comprise rain deflection flaps, said rain deflection flaps including an outer flap extending over an outer surface of said sidewall of said bed and an inner wall removably attachable to said sidewall frame sections by hook and loop material fasteners.

8. A pickup tent removably mounted to a bed of a pickup truck, said bed having a generally rectangular floor, first and second generally parallel sidewalls and a front wall, said tent assembly comprising:

a generally rigid cover disposed over said bed, said cover hinged at a top surface of said front wall of said bed by a hinge so that a said cover pivots vertically about said hinge from a closed position flush with the top surfaces of said first and second sidewalls of said bed to an open position at an angle to the top surfaces of said first and second sidewalls of said bed, and from said open position at an angle to the top surfaces of said first and second sidewalls of said bed to a closed position flush with said top surfaces of said first and second sidewall frame sections;

a tent enclosure having first and second side tent walls and a rear tent wall, said first and second side tent walls extending from a bottom surface of said cover to said first and second sidewalls respectively when said cover is in the open position and said rear tent wall extending from said bottom surface of said cover to said floor when said cover is in the open position; and an expandable rod extending from said first sidewall through a sleeve in a bottom edge of said rear tent wall to said second sidewall, said expandable rod holding said bottom edge of said rear tent wall secure against said floor so that said rear tent wall is held at least partially taut.

9. The pickup tent of claim 8 further comprising a support rod having first and second ends, said first end pivotally mounted to either said first or said second sidewall and said second end pivotally mounted to the bottom surface of said cover, said support rod extending to support said cover while said cover is in the open position and collapsing as said cover is pivoted to the closed position.

10. The pickup tent of claim 8 wherein said tent enclosure at least partially folds and stores under said cover so that said tent enclosure is held substantially flush to the bottom surface of said cover when said cover is moved to the closed position.

11. The pickup tent of claim 8 wherein said first and second side tent walls of said tent enclosure further comprise mesh tent windows.

12. The pickup tent of claim 11 wherein said mesh tent windows are at least partially covered by a tent window flap.

13. The pickup tent of claim 8 wherein said rear tent wall further comprises a tent door opening.

14. The pickup tent of claim 13 wherein said tent door opening is at least partially covered by a door opening tent flap.

15. The pickup tent of claim 8 wherein said first and second side tent walls of said tent enclosure comprise rain deflection flaps, said rain deflection flaps including an outer flap extending over an outer surface of said sidewall and an inner wall removably attachable to said sidewall frame section by hook and loop material fasteners.

* * * * *